US009495532B1

(12) United States Patent
Zhurkin

(10) Patent No.: US 9,495,532 B1
(45) Date of Patent: Nov. 15, 2016

(54) IMAGE BASED TILE PUZZLE CAPTCHA SYSTEM

(71) Applicant: Mikhail Zhurkin, Bethesda, MD (US)

(72) Inventor: Mikhail Zhurkin, Bethesda, MD (US)

(73) Assignee: Mikhail Zhurkin, Bethesda, MD (US)

( * ) Notice: Subject to any disclaimer, the term of this patent is extended or adjusted under 35 U.S.C. 154(b) by 0 days.

(21) Appl. No.: 15/082,279

(22) Filed: Mar. 28, 2016

(51) Int. Cl.
*G06F 21/36* (2013.01)

(52) U.S. Cl.
CPC ....... *G06F 21/36* (2013.01); *G06F 2221/2133* (2013.01)

(58) Field of Classification Search
CPC .............. G06F 21/36; G06F 2221/2133; G06F 21/316; G06F 2221/2103
See application file for complete search history.

(56) References Cited

U.S. PATENT DOCUMENTS

| | | | | |
|---|---|---|---|---|
| 2008/0127302 A1* | 5/2008 | Qvarfordt | ............... | G06F 21/36 726/2 |
| 2009/0113294 A1* | 4/2009 | Sanghavi | .............. | G06F 17/211 715/269 |
| 2010/0306055 A1* | 12/2010 | Kolb | .................. | G06Q 30/0257 705/14.55 |
| 2011/0150267 A1* | 6/2011 | Snelling | ................ | G06F 21/316 382/100 |
| 2012/0323700 A1* | 12/2012 | Aleksandrovich | ..... | G06Q 30/00 705/14.69 |
| 2013/0104217 A1* | 4/2013 | Kruger | .................... | G06F 21/36 726/7 |
| 2014/0181936 A1* | 6/2014 | Picard | .................. | G06F 21/316 726/7 |
| 2015/0170204 A1* | 6/2015 | Inbar | ...................... | G06Q 30/02 705/14.55 |
| 2016/0036821 A1* | 2/2016 | Vandemar | ............. | H04L 63/102 726/4 |

OTHER PUBLICATIONS

Payal, Nitisha, et al. "JigCAPTCHA: An Advanced Image-Based CAPTCHA Integrated with Jigsaw Piece Puzzle using AJAX," International Journal of Soft Computing and Engineering (IJSCE) ISSN: 2231-2307, vol. 2, Issue—5, Nov. 2012.*
Khot, Rohit Ashok et al. "MARASIM: A Novel Jigsaw Based Authentication Scheme Using Tagging," In Proc. ACM CHI (2011), 2605-2614.*
Gao, Haichang, et al. "A Novel Image Based CAPTCHA Using Jigsaw Puzzle," Proceedings of the 2010 13th IEEE International Conference on Computational Science and Engineering, p. 351-356, Dec. 11-13, 2010.*

* cited by examiner

Primary Examiner — Darren B Schwartz

(57) ABSTRACT

This invention is an image-based CAPTCHA system that relies on human users changing location and orientation of multiple partial fragments of complete images. The underlying source images represent objects, symbols, concepts or text recognizable by a human user. Such source images are fragmented by the system into a group of image fragments, with selected portions of resulting fragments being omitted and optionally distorted in order to prevent automated assembly of the resulting group of fragments into a representation of the source image by simple means of boundary inspection. Once the user arranges the fragment tiles into the orientation that they believe represents the original image and submits their answer to the system, the user's answer is evaluated to determine whether the challenge posed by the system was passed successfully.

5 Claims, 3 Drawing Sheets

IMAGE BASED TILE PUZZLE CAPTCHA SYSTEM

TECHNICAL FIELD

This invention relates to a Completely Automated Public Turing test to tell Computers and Humans Apart (CAPTCHA) image authentication method and system, and more particularly, to the generation of attack-resistant, user-friendly, image-based CAPTCHAs that rely on human users changing location and orientation of multiple partial segments of complete images.

BACKGROUND OF THE INVENTION

A challenge-response test for telling apart a human from an algorithmic system is known as a Turing Test. When a computer program is able to generate such tests and evaluate the result, it is known as a Completely Automated Public Turing tests to tell Computers and Humans Apart (CAPTCHA), also known as Human Interactive Proof (HIP).

Systems for automated administration of CAPTCHAs in order to grant the challenged entity access to information content or an application interface—as in a publically accessible website—are traditionally based on presentation of images of text in which characters (typically Latin alphabet letters and digits) are arranged and distorted to prevent algorithms from segmenting the image of the text into individual characters and recognizing the latter.

The challenged entity's successful interpretation of the image and the correct sequence of alphanumeric characters being submitted as the answer is taken as a sign that the entity interacting with the system is human. This ability is useful for publically accessible websites that attempt to deny or limit access to programmable algorithmic systems ("bots") acting as machine-implemented impostors of human users.

However, research results show that computers systems are currently as good (and sometimes better) than humans at recognizing even highly distorted single characters. Modern text-based CAPTCHAs rely on non-trivial placement of individual characters and systematic addition of noise and distortion in order to increase difficulty of separation of characters and individual character recognition. Attempts to make these systems harder to break have a natural complexity limit where the presented images are too hard for humans to decipher to be practical.

Furthermore, continuing reliance on text-based CAPTCHAs aimed at diverse user groups requires either development of additional alphabet-specific CAPTCHAs for speakers of languages with non-Latin alphabets, or further limiting the image complexity due to lower precision of character recognition of Latin characters by users who interact with Latin alphabet less frequently.

In cases where CAPTCHA images are presented to users on a screen of a handheld device, the size and level of detail of the test image—and therefore complexity and robustness of protection against an algorithmic agent—is limited further. Mobile systems that display the equivalent of user keyboard on part of a screen further reduce the eligible size of test images, while simultaneously making it more difficult to switch between characters and digits when submitting user input. In cases of multilingual users solving a CAPTCHA in alphabet other than the default setting of the device, a further usability barrier arises with need to switch between the default alphabet input mode setting and one used for input of the CAPTCHA solution string.

An additional complication in practical administration of CAPTCHAs of high complexity is necessity to present multiple tests in cases where not all test sequences are easily recognizable by users. This leads to users being frustrated by the experience of interacting with such systems and results in high level of dissatisfaction and scepticism with the overall approach.

Therefore, between continuing advances of easily available character recognition as well as segmentation algorithm implementations and inherent limitations on increasing the complexity of CAPTCHA challenge images, the gap between humans and algorithms successfully solving CAPTCHA challenges is increasingly narrowing. Conventional text-based CAPTCHA will eventually be unsuitable. Alternative solutions to text-based CAPTCHAs are needed.

BRIEF SUMMARY OF THE INVENTION

This invention is a system for producing image-based CAPTCHAs and evaluating user interactions with the components of resulting CAPTCHAs.

The system accepts an image as its source input, segments the input image into radially symmetrical fragments, then presents an altered arrangement of the resulting image fragments to the user, and receives information about subsequent user actions.

The client component of the system allows for the transposition and rotation of the displayed image fragments by the user so that the initially presented altered placement of the fragments can be rearranged by the user into positioning and orientation initially produced by the server component of the system.

The resemblance of the intended arrangement of the tiles to the original image is apparent to a human who can recognise objects, symbols, or text present in the original image—but due to gaps between the image fragments and distortions of the image fragments near the fragment boundaries an algorithmic system posing as a human user is not able to use simple fragment boundary inspection to produce correct alignment of image fragments.

BRIEF DESCRIPTION OF THE DRAWINGS

The Description is set forth with reference to the accompanying figures.

DETAILED DESCRIPTION OF THE INVENTION

This invention is realized as a two-component (client and server) system for producing image-based CAPTCHAs and evaluating user interactions with the resulting CAPTCHAs.

The server component of the system accepts images as its source input, produces radially symmetrical fragments of the images, transmits the resulting image fragments to the client component of the system, and receives information about user actions from the client component of the system.

Figure 1:
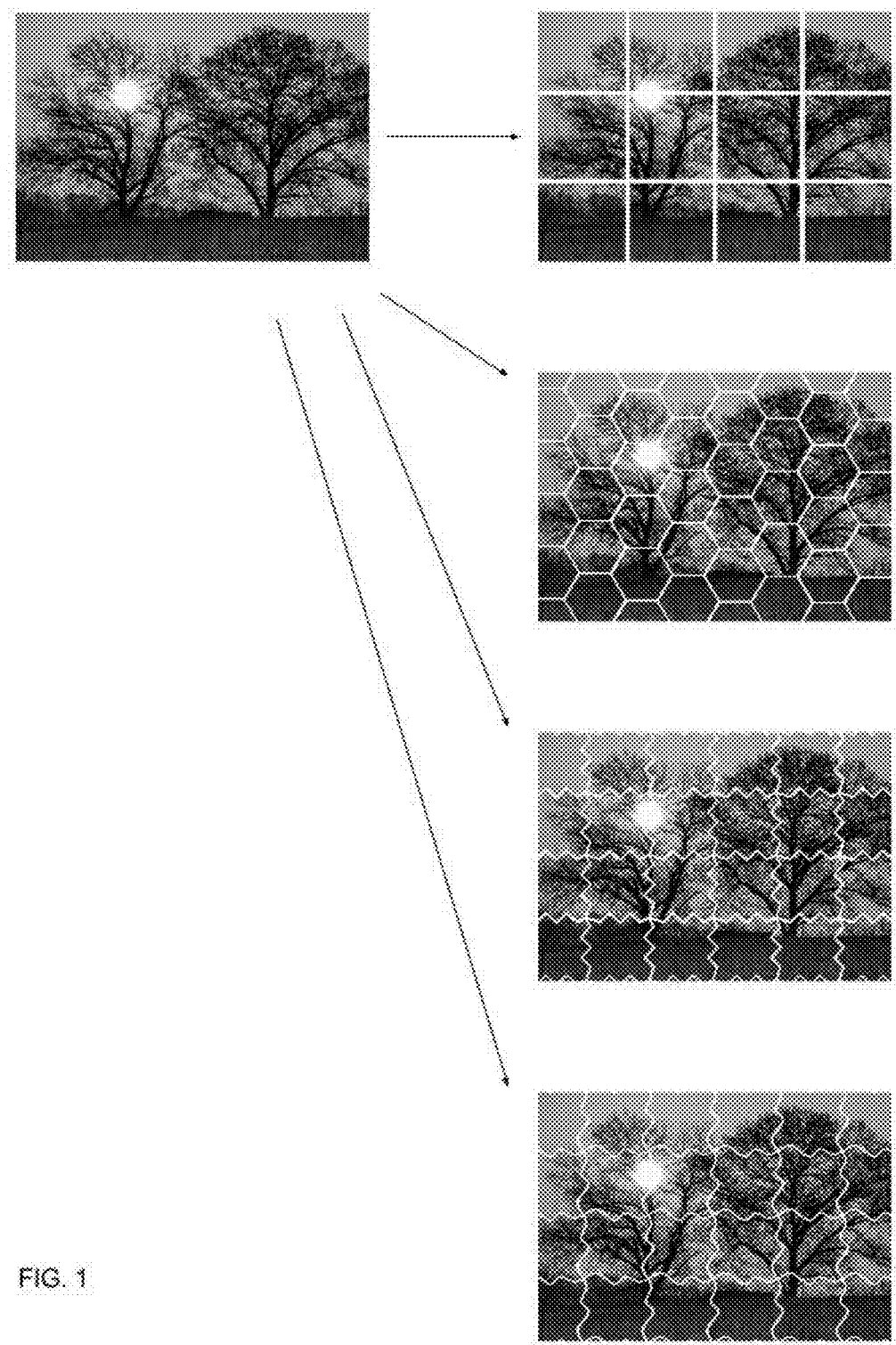
FIG. 1 depicts a few possible methods of segmenting a source image into an arrangement of identically shaped radially symmetrical fragments.

The produced fragments are presented to the user by the client component of the system as an arrangement of radially symmetrical tiles within display confines of a logical positioning grid. FIG. 1 depicts a few exemplary methods for image segmentation and tile generation. The selected shapes of fragments themselves can vary widely between different segmentation approaches (which itself present an additional challenge to any possible algorithmic attempt to circumvent the system) as long as the fragment shape is based on a equilateral polygon, and the outer edges of the segment are shaped by identical curves or polylines. In this case, eligible increments in angle of rotation when positioning the tile and aligning the tile with the adjacent tiles (and the number of possible orientations of any individual tile) are driven by the number of edges of the polygon used as the shape source, and the alignment of the individual tiles is guaranteed by the sameness of the boundary chosen as the shape of the edges forming the tile boundaries. Simplest arrangement satisfying those criteria is segmentation of image into square tiles, and this example is used in all the following drawings and examples.

Figure 2:
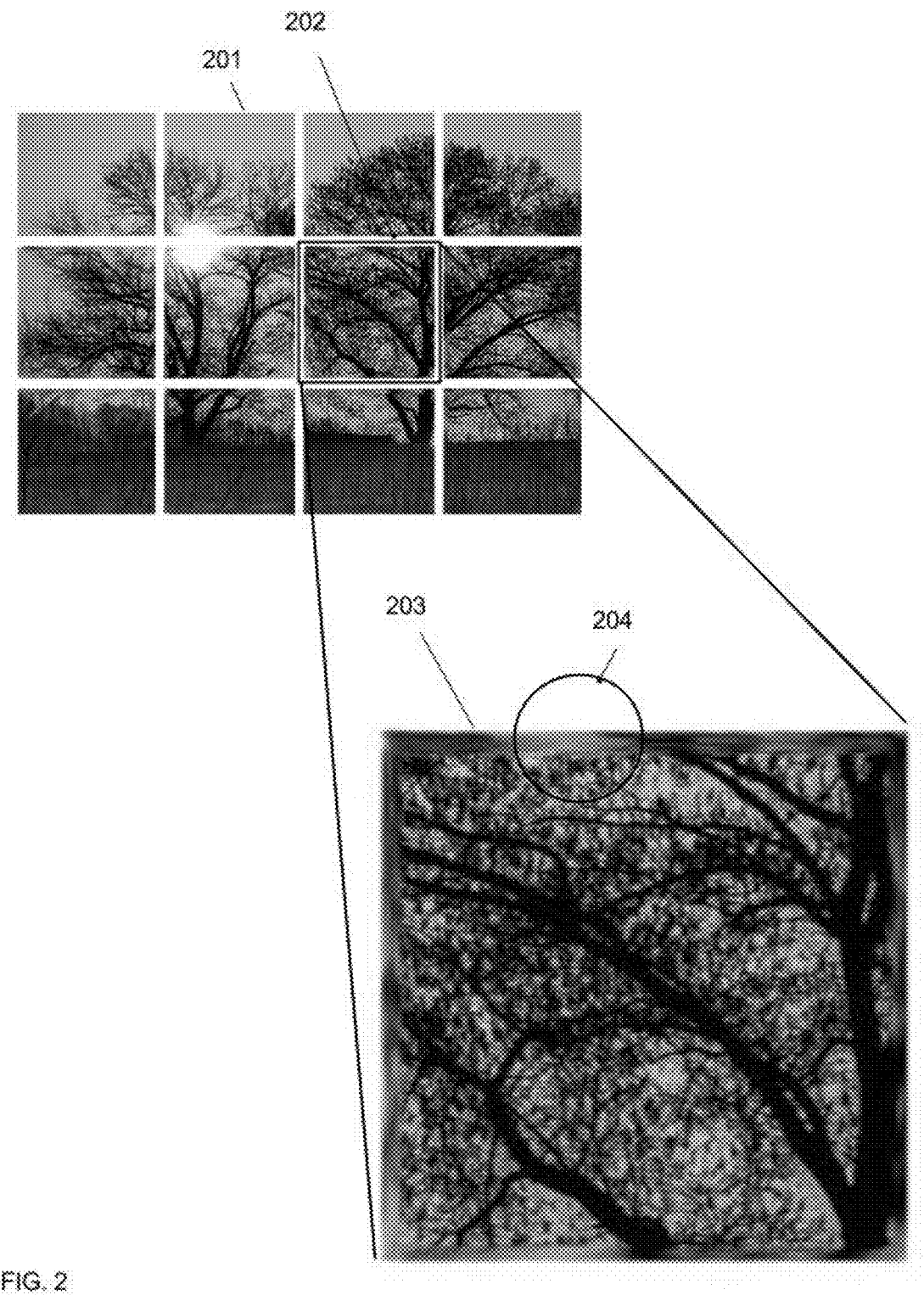
FIG. 2 depicts an exemplary image segmentation into a number of square tiles and highlights an area of pixelated distortion around the tile boundary.

The resemblance of the intended arrangement of the tiles to the original image is apparent to a human who can recognise objects, symbols, or text present in the original image. However, in order to prevent an algorithmic solution from circumventing the system and deduce correct arrangement of tiles based on simple alignment analysis of the narrow boundaries along the segments' edges, the source image is separated into segments with gaps between them. FIG. 2 (201) demonstrates such example segmentation of an image with parts of the image being omitted from inclusion into any of the resulting tiles. Furthermore, after separation of the source image into the fragment tiles, a non-uniform thickness boundary immediately adjacent to the fragments' edge is distorted—by altering image pixel colors with average color values of pixels around them, modifying image pixel colors by random shifts along a color spectrum, randomly swapping pixels and pixel groups between different fragments, or a combination of all of the above approaches. FIG. 2 (202) depicts the source non-distorted image tile, with (203) being a larger-scale depiction of the same tile where (204) distortion is applied to the tile boundary. This further prevents an algorithmic approach from deducing correct arrangement of the tiles by means of statistical analysis of pixel and pixel group color sequences within narrow bands of the image immediately adjacent to the tiles' edges.

Figure 3:
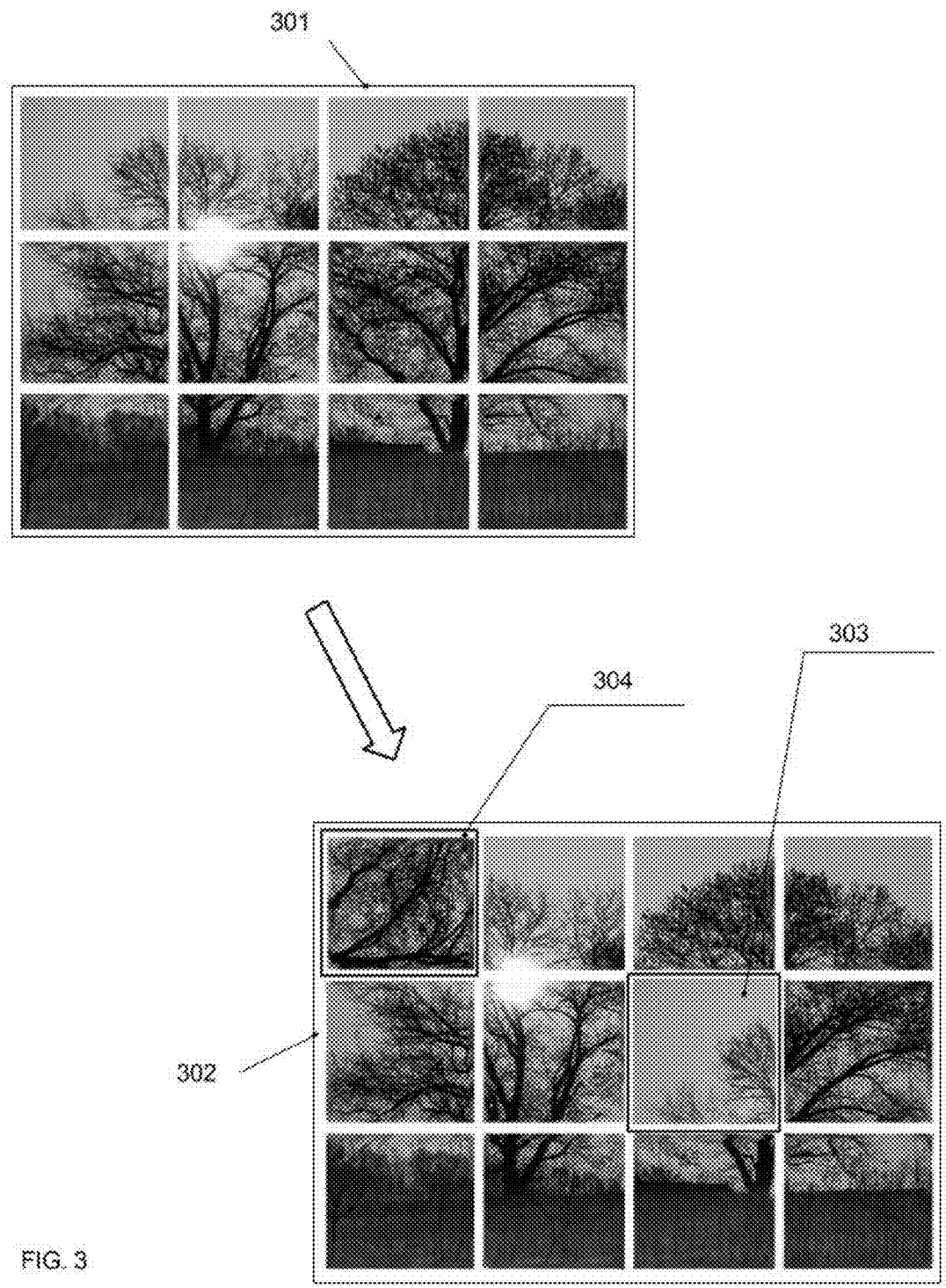
FIG. 3 depicts an exemplary presentation of image tiles to the user, where one of the tiles (303) is simply transposed from its original location, while another tile (304) is both transposed from its original location and rotated.

The arrangement of tiles presented to the user by the client component includes all the fragments that comprise together the totality of the original image, but with locations of some of the fragments swapped with each other, some fragments rotated around the fragment's axis of symmetry, or a combination of both (where a fragment is both rotated and transposed to the original location of another fragment in a positional grid.) FIG. 3 depicts an example of a source image (301) being accordingly altered (302) for the presentation to the user. Tiles can be presented as simply transposed from their original location within the image (303), rotated compared to their original orientation within their source image, or a combination of both (304).

The client component of the system allows for the manipulation of the displayed tiles so that the image tiles can be swapped with each other as well as rotated in order to be arranged into the positioning and orientation initially produced by the server component of the system.

Each fragment tile repositioning and rotation directed by a user action is captured by the client component of the system.

The resemblance of the intended arrangement of the tiles to the original image is apparent to a human user who can recognise objects or text present in the original image, but due to gaps between the image fragments and distortions of the image fragments near the fragment boundaries an algorithmic system posing as a human user is not able to use simple fragment boundary inspection to produce correct alignment of image fragments.

Once the user arranges the fragment tiles into the orientation that they believe represents the original image, they submit their answer to the system using the client component, and the system compares the user's answer to the preserved description of the original arrangement of the image fragments produced by the system.

If the answer submitted by the user and transmitted by the client component of the system to the server component describes the same locations and orientation of the tiles as the original, pre-modification arrangement of the segments of the image, that answer is interpreted as the user's ability to identify the objects, symbols, or text depicted by the image, and therefore a successful response to the challenge posed by the system.

The invention claimed is:

1. A method of generating a Completely Automated Public Turing test to tell Computers and Humans Apart (CAPTCHA), the method comprising:
   processing, by a server component, a source image which depicts an original arrangement comprising: object, symbol, or text intended for human recognition, where the source image is segmented into a plurality of image fragments, the plurality of image fragments being radially symmetrical image fragments;
   preventing an algorithmic approach from deducing the original arrangement by means of statistical analysis of pixel or pixel group color sequences within bands of the plurality of image fragments, by segmenting the plurality of image fragments, the segmenting comprises:
      applying to only at least one edge of each fragment, of the plurality of image fragments, a non-uniform thickness boundary immediately adjacent to the at least one edge of each fragment by performing one or more of: altering image pixel colors with average color values of pixels around them, modifying image pixel colors by random shifts along a color spectrum or randomly swapping pixels and pixel groups between different fragments;
   generating a resulting arrangement via an altered positioning arrangement of said plurality of image fragments where a number of the plurality of image fragments are at least one of: transposed with each other or rotated around their own center of symmetry;
   presenting on a screen of a client device to a user, the resulting arrangement of said plurality of image fragments;
   capturing actions of the user, by the client device, regarding altering positioning and rotation of the plurality of image fragments within a logical positioning grid;
   transmitting the actions of the user regarding image fragment repositioning within the logical positioning grid;
   transmitting a final arrangement of the plurality of image fragments that is selected by the user as intended to depict original locations and orientation of the plurality of image fragments within the source image;

indicating, by the server component, a successful response based on a comparing of the final arrangement with the original arrangement matching locations and orientations of the original arrangement.

2. The method of claim 1, the method further comprising a boundary of uniform thickness being removed from a periphery of each fragment of the plurality of image fragments before being presented to the user.

3. The method of claim 2, further comprising the plurality of image fragments are initially processed to remove a uniform boundary around each of them and remaining portions are processed to obtain a non-uniform distorted boundary.

4. The method of claim 1, the method further comprising time-stamped information associated with actions of the user is transmitted to determine potential impersonation by an algorithmic system.

5. The method of claim 1, where a designated display is one of: a programmable Application Program Interface (API) endpoint, an application program user interface, or a web-page.

\* \* \* \* \*